United States Patent [19]

Bennington et al.

[11] Patent Number: 4,918,652

[45] Date of Patent: Apr. 17, 1990

[54] REAL-TIME SIMULATION CLOCK

[75] Inventors: Donald R. Bennington; Daniel J. Crawford, both of Newport News, Va.

[73] Assignee: The United States of America as represented by the Administrator of the National Aeronautics and Space Administration, Washington, D.C.

[21] Appl. No.: 251,073

[22] Filed: Sep. 28, 1988

Related U.S. Application Data

[63] Continuation-in-part of Ser. No. 10,949, Feb. 5, 1987, abandoned.

[51] Int. Cl.⁴ .................... G06F 1/04; G06F 15/52; G06F 15/50
[52] U.S. Cl. ........................ 364/900; 364/933.8; 364/934; 364/924.4; 364/925.1; 364/578
[58] Field of Search ........ 364/200, 900, 200 MS File, 364/900 MS File, 578; 340/825.2

[56] References Cited

U.S. PATENT DOCUMENTS

| | | | |
|---|---|---|---|
| 3,932,843 | 1/1976 | Trelut et al. | 364/200 |
| 4,456,994 | 6/1984 | Segarra | 364/200 X |
| 4,484,266 | 11/1984 | Becker et al. | 364/200 |
| 4,545,029 | 10/1985 | Collier | 364/900 |

Primary Examiner—Gareth D. Shaw
Assistant Examiner—Paul Kulik
Attorney, Agent, or Firm—George F. Helfrich; John R. Manning; Charles E. B. Glenn

[57] ABSTRACT

The invention is a Clock for synchronizing operations within a high-speed, distributed data processing network. The clock is actually a distributed system comprising a Central Clock and multiple Site Clock Interface Units (SCIU's) which are connected by means of a fiber optic star network and which operate under control of separate clock software. The presently preferred embodiment is as a part of the flight simulation system now in current use at the National Aeronautics and Space Administration (NASA) Langley Research Center (LaRC), Hampton, Va.

7 Claims, 4 Drawing Sheets

REAL-TIME SIMULATION CLOCK

ORIGIN OF THE INVENTION

The invention described herein was made by employees of the U.S. Government and may be used by or for the Government of government purposes without payment of any royalties thereon or therefor.

CROSS REFERENCE TO RELATED APPLICATION

This is a continuation-in-part application of patent application Ser. No. 07/010,949, filed 5 Feb. 1987, and abandoned 9-28-88.

TECHNICAL FIELD OF THE INVENTION

The invention relates generally to the field of distributed data processing systems, and more specifically to a clock for synchronizing high speed processes occuring at remote sites under the control of a central computer.

BACKGROUND OF THE INVENTION

Langley Research Center (LaRC) in Hampton, Va., a ficility of the National Aeronautics and Space Administration (NASA), has employed flight simulation to support engineering research for at least 35 years. The vehicles most often studied are aircraft and spacecraft, but occasionally the facility is used to study more exotic systems such as trains, particle beams, flow control in wind tunnels, and aircraft landing carriages. The research engineer is usually testing a new or improved design in the area of automatic or augmented control, handling qualities, guidance, navigation, flight management, terminal air traffic management, air combat tactics or some combination of these. Different unrelated simulations are run simutaneously and the same simulation equipment may be used in sequential three-hour periods throughout the day to support different independent studies.

Recently, it was decided to replace the old equipment at LaRC by a design developed around a high-speed network technology called Computer Automated Measurement and Control (CAMAC). This network technology was developed by, and is widely used by, investigators in the particle accelerator field. It has many laudable features, not the least of which is that it conforms to a national and international standard. CAMAC, as used at LaRC, has two major components: an addressable, powered electronic chassis called a Crate with a backplane bus called a Dataway; and a ring master-slave network called a Highway which connects crates to the mainframe computer. The highway has a clock rate of five bytes per microsecond and a maximum useable data rate of three bytes per microsecond, but it uses very little handshaking protocol, does not block buffer data within the network, and does not compete (bus contention) for network services.

With this new design, it is necessary to have a clock system to synchronize simulations so as to obtain maximum utility from the equipment. This synchronization is necessary both to preserve the illusion of reality for the pilots and to permit rigid scheduling of demanding simultaneous applications.

It is therefore the primary object of this invention to provide a clock system for the synchronization of computations in a system that has a central computer and several remote sites that utilize the computer.

Other objects and advantages of this invention will become apparent hereinafter in the specifications and drawings.

BRIEF SUMMARY OF THE INVENTION

The invention is a Clock for synchronizing operations within a data processing network. The clock is actually a distributed system comprising a Central Clock and multiple Site Clock Interface Units (SCIU's) which are connected by means of a fiber optic star network.

The Central Clock broadcasts two distinct signals to each remote site where they are reveived and interpreted by an SCIU.

The first signal is a Timing Tic with a constant short interval (500 microseconds as currently practiced). All timed events in the system occur at even multiples of the Timing Tic interval.

The second signal, called the Job Sinc Tic has a longer period called the Clock Common Multiple (CCM), which is set by the operator prior to starting the system. The CCM is a multiple of the Timing Tic interval, but is also further constrained in that it must be evenly divisible by the Frame Time Interval described below.

When a specific simulation job is initiated, a Frame Tic Count representing an appropriate Frame Time Interval is set in the SCIU by the Static Scheduler (software running on the central computer). The Frame Time Interval defines the period during which the central computer must complete the input, calculation and output for that site's simulation. The static scheduler's control over setting of the Frame Time Interval allows dynamic re-configuration of remote site SCIU's. When the number of Timing Tics received equals the Frame Tic Count the SCIU issues a signal known as a Frame Tic. Upon generation of a Frame Tic, the SCIU issues a Look at Me' signal over the communications highway, which then initiates a single input-process-output cycle of the central computer.

For a job to be entered for execution, a job's Frame Time Interval must be an integral factor of the CMM. Addditionally, the SCIU will wait to start the first Frame Time Interval of the session simutaneously with the arrival of the Job Sync Tic. Once actually submitted for execution, the Monitor will begin execution of a simulation job only upon receipt of a Job Sync Tic.

These constraints result in the condition that all remote sites, regardless of frame time, should receive a Frame Tic simultaneously with the receipt of a Job Sync Tic. When Job Sync Tic arrives, all SCIU's check to ensure that the expected simultaneous generation of a Frame Tic has in fact taken place. If any SCIU fails to maintain synchronization, an error signal informs the Monitor and the running real time simulation and all remote sites which it controls are halted.

DETAILED DESCRIPTION OF THE INVENTION

GLOSSARY OF TERMS

Due to the specialized nature of the word usage in the following Detailed Description of the Invention, this Glossary of Terms Used is provided for clarification and inclusion as an integral part of those detailed specifications.

CENTRAL COMPUTER: A very fast mainframe computer running the stored programs which contains the equations of motion for the type of activity being simulated (typically fixed and rotary wing aircraft and spacecraft).

REMOTE SITE: A location some distance (often exceeding 1000 feet in present practice) from the central computer at which either the simulator hardware or peripheral computing equipment is located.

CAMAC (Computer Automated Measurement and Control): A high-shaped network technology widely used in the particle accelerator field. As presently used, CAMAC has two major components:

CRATE: An addressable, powered electronic chassis with a backplane bus called a dataway. There is at least one crate at each remote site, and peripherals which must communicate with the central computer are connected to the dataway, as is the interface with the highway.

HIGHWAY: A ring master-slave network which connects the crates to the central computer. The highway referred to in this application has a clock rate of five bytes per microsecond and a maximum useable data rate of three bytes per microsecond.

FIBER OPTIC NETWORK: The type of communications hardware and softward with which CAMAC system's highway and the Real Time Simulation Clock's timing network are implemented. It comprises fiber optic cables between the central computer and each crate at each remote site, fiber optic converters which convert between electrical signals and light pulses at each interface between cable and electronic hardware, and control and error checking softward.

REAL TIME SIMULATION: The task of presenting a computer generated environment to an operator in such a way that the simulation appears, acts and reacts exactly as it would if it were real. Successful simulations of aerodynamic flight require the recomputation of the equations of motion for the airframe at intervals in the range of every 5 to 50 milliseconds.

REAL TIME SIMULATION JOB: A stored program running on the central computer which periodically accepts input data from the remote site, computes the solution to the equations of motion according to the parameters for the specific airframe or environment being simulated, and puts out revised solutions which the simulators at the remote site can then convert into the various physical motions or responses required to sustain the appearance of reality.

TIME SLICE: The portion of the frame time interval allocated to the real time simulation job within which it has access to the central computer's processor for performing simulaiton calculations.

MONITOR: The memory resident portion of the operating system of the central computer which manages computer resources, including the allocation of time slices to various real time simulation jobs in accordance with their priority. The time slice allocations are made with reference to the signals generated by the central clock. If a timing error signal or loss synchronization occurs, the monitor stops the simulation jobs.

STATIC SCHEDULER: Software running on the central computer which determines whether the central computer has the assets to run a particular simulation job, whether the requested frame times are integral factors of the CCM, and whether the necessary hardware is available and in an operational status. If these conditions are met, the static scheduler dynamically reconfigures the network, presets frame time registers in the SCIU's, and submits the simulation job to the monitor to be run.

DYNAMIC NETWORK CONFIGURATION: This refers to the static scheduler's ability to connect and disconnect the various sites as necessary to configure them properly for the requested job. A research center at which experimenters schedule multiple jobs of widely varying types throughout the day requires this ability to dynamically reconfigure the network without interrupting other jobs in progress.

SYNCHRONIZATION CLOCK: A timing system to coordinate real time computer simulations which comprises a Central Clock, Site Clock Interface Units, and all associated communications softward and hardware.

CENTRAL CLOCK: The central clock provides an accurate time base for both the central computer and the remote sites, and ensures the synchronization of all simulation jobs and their associated hardware. It gives time references directly (by way of a fiber optic timing network) to each SCIU at the remote sites, and indirectly (by way of the CAMAC highway) to the central computer.

OSCILLATOR FREQUENCY: The heart of the central clock as currently practiced is a highly accurate, oven controlled crystal oscillator which produces a 5 MHz signal. This frequency is then reduced to 1 MHz to form the central clock frequency.

CENTRAL CLOCK SIGNAL: This 1 MHz signal is the carrier into which the lower frequency timing tics and job sync tics are encoded or imbedded. The 1 MHz is transmitted to the SCIU's which in turn extract the lower frequency timing information.

TIMING TIC: A one byte pattern consisting of binary "11100011" which is embedded in the cental clock signal and sent over the timing network every 0.5 milliseconds. The SCIU counts timing tics when calculating the time between frame tics.

JOB SYNC TIC: A one byte pattern consisting of binary "11111011" embedded in the cental clock signal. It is sent over the timing network at the CCM intervals selected by the operator. At the beginning of a job session the SCIU waits before issuing the first frame tic for a given real time simulation job until the SCIU receives a job sync tic which is used as a reference to synchronize concurrent real time simulation jobs with different frame time intervals.

CCM (Clock Common Multiple): the job sync tics are generated by the central clock at an interval which is a multiple of 0.5 milliseconds known as the Clock Common Multiple, normally either 12,000 or 24,000 (which would produce job sync tics every 6 or 12 seconds respectively). The constraint that all frame time intervals are integral factors of the CCM restricts the set of allowable frame times. However, in doing so, it permits the calculations to be made which are necessary to determine whether the central computer has the processing power to service jobs with different frame times concurrently.

SCIU (Site Clock Interface Unit): The device at each site which generates frame tics by counting timing tics. Additionally the SCIU's monitor the coincidence of frame tics with job sync tics and report a timing error if they do not match. For this reason all frame times for all concurrently running simulations must be divisible into the Clock Common Multiple, so that the job sync tic will occur simultaneously with frame tic at all SCIU's. The SCIU's are connected via fiber optic cable to the central clock, and it is over this clock network that timing signals pass. They are also connected to the site's CAMAC crate dataway, over which they periodically send the CAMAC system's LAM signal, and control events within the crate such as triggering the analog-to-digital converters.

FRAME TIME INTERVAL: This is a programmagle time interval which is a multiple of 0.5 milliseconds, is an integral factor of the Clock Common Multiple, and was pre-determined by the programmer who wrote the simulation. It is within this frame time that the central computer must accept input from the remote sites over the highway, acquire a processor time slice from the monitor sufficient to calculate the revised solutions to the equations contained in the program for the real time simulation job, and outut the solutions back to the remote sites. In the numerical solution of the ordinary non-linear differential equations of the system model, the frame time interval equals the magnitude of the step in time between successive solutions points.

FRAME TIME REGISTER: That register within the SCIU which contains the frame tic count. This register is loaded via the CAMAC highway from the central computer upon instructions from the static scheduler, and is set for each new simulation job in the SCIU of each remote site assigned to the job as the job is initiated.

FRAME TIC COUNT: The number of timing tics necessary to equal a frame time interval.

FRAME TIC: The SCIU generates a frame tic at the end of each frame time interval. This tic does not leave the remote site, but is used internally and for providing synchronization information to peripheral devices. It triggers a LAM signal which is sent up the CAMAC highway to alert the cetral computer to start reading data.

LAM (Look at Me) SIGNAL: A CAMAC signal generated by the SCIU at each frame tic and sent over the highway from a crate at a remote site to the central computer. The LAM signal indicates that the remote site is ready to send data.

LOSS OF SYNCHRONIZATION: The most important constraint on real-time simulation, and the characteristic which most distinguishes it from other scientific computing, is that it must be computed in strict synchronization with the external world, the equipment, and the pilots with which the computer interacts. Once time synchronization is lost, the central computer has no way of generating meaningful solutions to real time problems, and the monitor shuts down the simulation jobs until the error can be corrected. An example of this is when an SCIU determines loss of synchronization by comparing the arrival of a job sync tic with the generation of a frame tic. If these do not occur simultaneously, an error signal is generated by the SCIU, retured to the monitor, and the simulation job is shut down.

PREFERRED EMBODIMENT

Although the invention is a clock which can be used for a wide number of distributed data processing applications, the presently preferred embodiment is as a part of the flight simulation system now in current use at the National Aeronautics and Space Administration (NASA) Langley Research Center (LaRC), Hampton, Va.

The LaRC advanced real-time simulation system employs high-speed digital networks called CAMAC highways between the two large mainframe computers at the central location and the remote sites. At any given time, six totally independent simulations can be accommodated simultaneously. An aircraft simulatin model is solved on one of the central computers and the simulation job is normally assigned one CAMAC highway. In certain special cases, a second highway can be assigned to a job. At set-up time, each simulation job requests the remote sites it needs by a computer control statement. If the sites are available, the static scheduler dynamically configures the network, elevates the job to a real-time status and submits the job to the monitor to run. All of this distributed activity is synchronized by a clock which is the preferred embodiment of this invention.

The advantage of this invention is that it provides a simple and straight forward way to synchronize demanding applications such as Real Time Simulation Jobs both to the external reference of the pilot/operator and to the internal functioning of a large mainframe computer running several applications concurrently.

Figure 1:
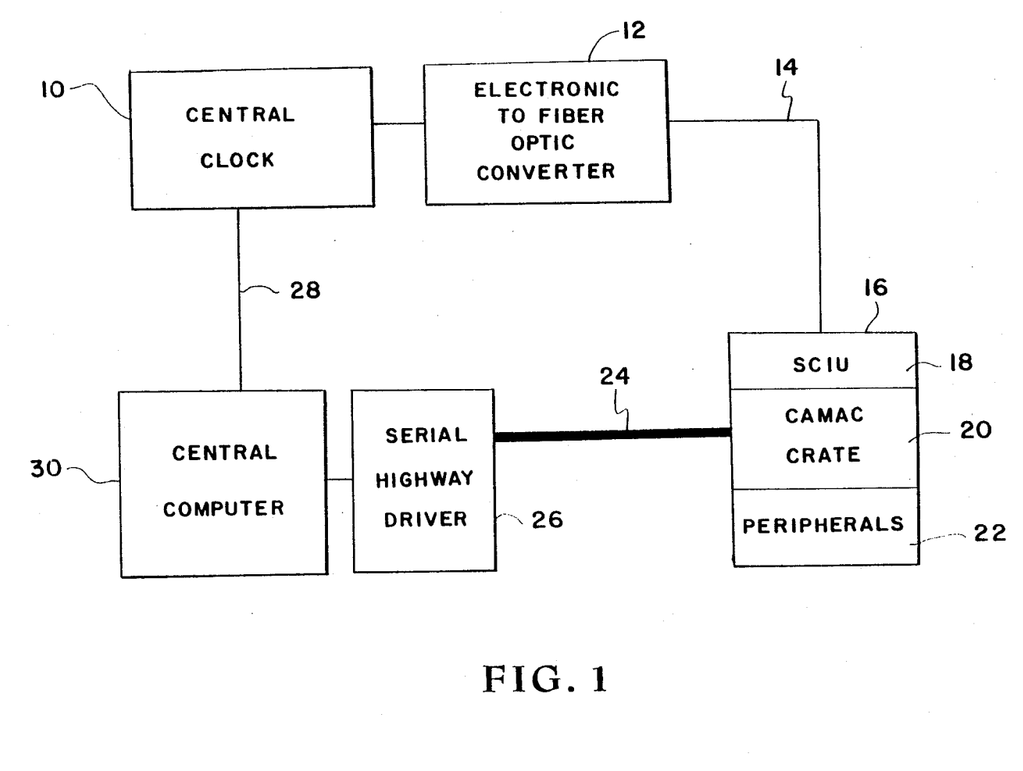
FIG. 1 A block diagram of the invention and of a system in which the invention is used.

Turning now to the drawings, FIG. 1 schematically depicts the Central Clock (10), the Central Computer (30) and a Remote Site (16). Only one remote site is shown, but it is to be understood that many more remote sites can utilize the services of the central computer, and that the sites are usually remote to each other as well as the central computer. As currently practiced, the Central Clock and the Central Computer are within the same room, but this is not absolutely necessary. The Central Computer can actually be several different computers, and it controls the network for transmitting the data and control signals back and forth between the central computer and the remote sites.

The Central Clock (10) communicates with the Central Computer (30) and each Remote Site (16). Communications with the Central Computer are via standard RS-232 connections (28) and are used to pass status messages from the central clock to the central computer. Communications between the Central Clock and the Remote Site are over single strand fiber optic cables (14). An electronic to fiber optic converter (12) transforms the clock signals before sending them to the Remote Site. The fiber optic cable method is particularly beneficial in this application due to its minimal signal loss over distance, thereby allowing for greater dispersion of the remote sites. At each Remote Site is a Site Clock Interface Unit (SCIU) (18), a CAMAC crate (20), and various peripherals (22) such as simulators, control pannels, display generators, etc. . . .

A CAMAC highway (24) connects the Remote Site crate (20) with a serial highway driver (26) at the Central Computer. As currently practiced, the CAMAC highway comprises a pair of optical fibers with an effective data transfer rate of three bytes per microsecond, a serial highway driver at the central computer, and a serial crate controller in each remote site crate.

Figure 2:
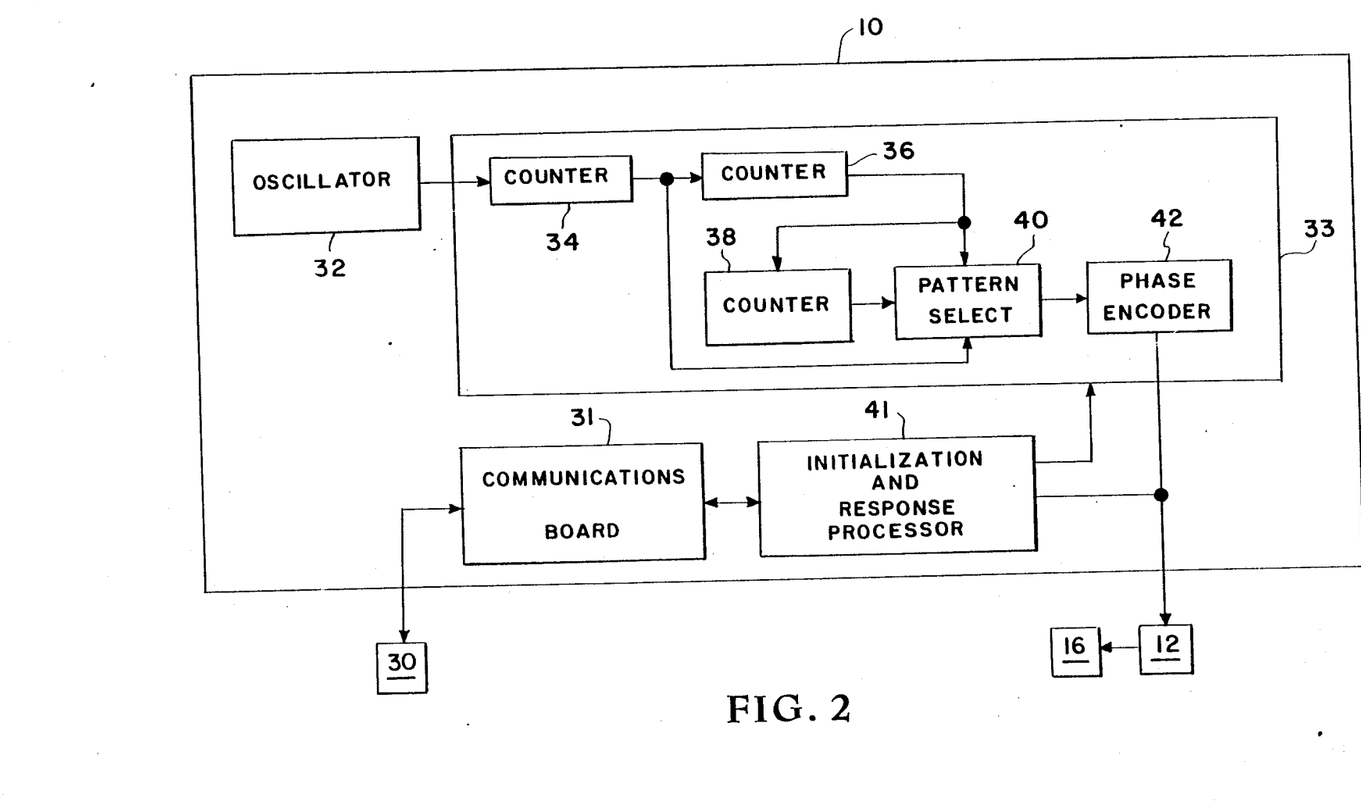
FIG. 2 A more detailed block diagram of the Central Clock portion of the invention shown in FIG. 1.

As shown in FIG. 2, the heart of the Central Clock comprises an oscillator (32) and a time interval generator (33). Additionally present is a processor (41) that initializes the Central Clock and responds to status requests from the Central Computer (30) and a communications board (31) that provides the Central Clock with linkage to the Central Computer (30). At LaRC the present oscillator is a highly accurate over-controlled crystal oscillator operating at a frequency of 5 MHz. Although this frequency will be used in all examples hereinafter, it is understood that individual practioners could choose other frequencies in utilizing this invention.

The Time Interval Generator (33) includes three Counters; a first Counter (34) which reveives the 5 MHz (5 cycles per microsecond) signal from the oscillator and reduces it to a 1 MHz (1 cycle per microsecond) Central Clock Frequency which is used as the carrier for timing signals; a second Counter (36) which revcieves the 1 MHz signal and produces Timing Tics at intervals of 500 microseconds (0.5 msec or 2000 cycles per second); and a third Counter (38) which receives the 0.5 msec Timing Tics and produces Job Sync Tics at the Clock Common Multiple (CCM) as preset upon clock initialization. Hereinafter for purposes of explication the CCM will be referred as 6 seconds (12,000 of the 0.5 msec signals), but it is understood that the CCM can be any multiple of the timing tic interval.

the 1 MHz carrier signal, the Timing Tics and the Job Sync Tics are all applied to a Pattern Select (40). When the Pattern Select receives a Timing Tic it generates a byte with the binary pattern of "11100011" and when it receives a Job Sync Tic it generates a byte with the binary pattern "11111011". Note that when a Job Sync Tic is received a Timing Tic is also received; however only a "11111011" pattern is generated. Note also that the frequency at which the "1"'s and "0"'s are generated is higher than the timing tic frequency, and this is the reason that the 1 MHz carrier signal is needed. Obviously patterns different from the two patterns mentioned above could be used without departing from this invention. Details of the Pattern Select not disclosed herein are considered within the skill of the art. The output of the Pattern Select is applied through a Phas Encoder (42) to the Electronic to Fiber Optic Converter (12) for transmission to the Remote Site (16).

Figure 3:
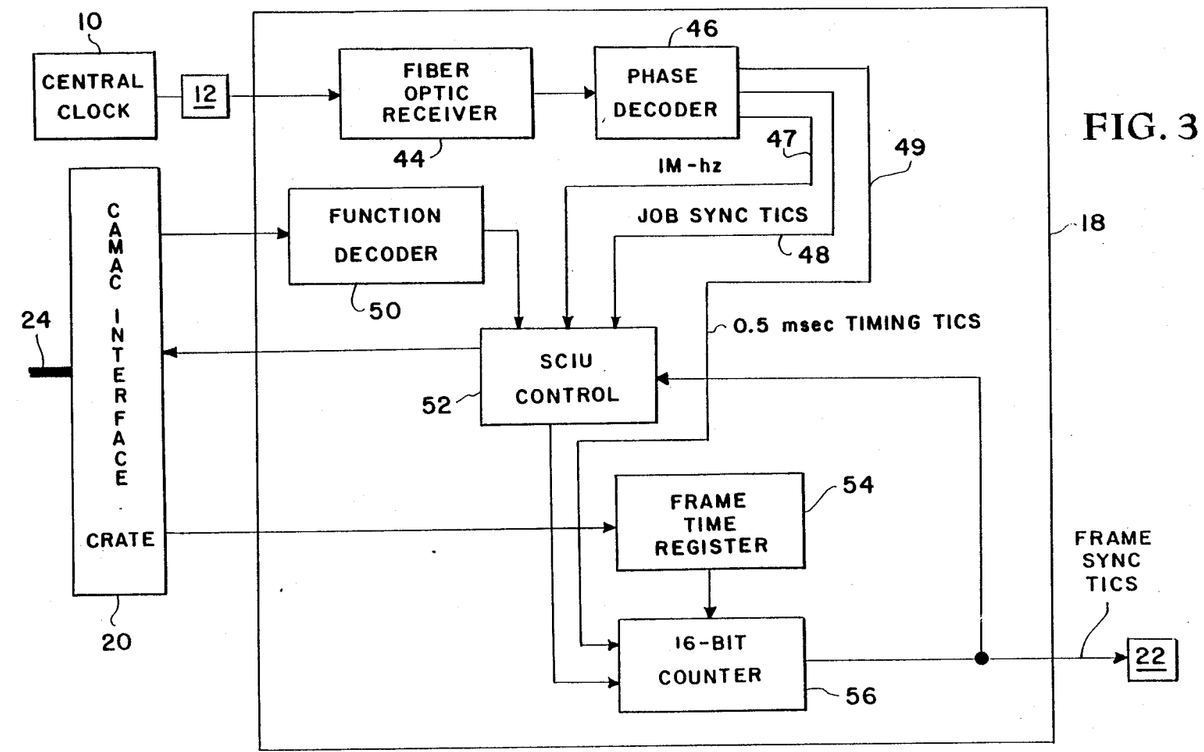
FIG. 3 A more detailed block diagram of the Site Clock Interface Unit (SCIU) of the invention shown in FIG. 1.

At each Remote Site (16) there is an SCIU (18), the details of which are shown in FIG. 3. As the signals from the Central Clock (10) reach the SCIU, they are converted back into electronic signals by the Fiber Optic Receiver (44) and passed to the Phase Decoder (46). The Phase Decoder produces three different signals on three different lines, the first of which is a 'clean' 1 MHz Carrier Signal (47) to the SCIU Control (52). Additionally, when the Phase Decoder receives a "11100011" pattern it sends a Timing Tic to the 16-Bit Counter (56), and when it receives a "11111011" pattern it sends both a Timing Tic to the 16-Bit counter (56) and a Job Sync Tic to the SCIU Control (52).

Whenever a Remote Site (16) is activated in preperation for the running of a simulation, a Frame Tic Count is sent out over the CAMAC Highway (24) to the CAMAC Crate (20) at the Remote Site. This Frame Tic Count is passed to the SCIU (18), and stored in the Frame Time Register (54).

Once the Frame Tic Count has been sent to the SCIU, the Real Time Simulation Clock system is ready for use:

Operation is started by a 'frame tic enable' signal which the Central Computer sends over CAMAC Highway (24) and which is applied to the Function Decoder (50), interpreted, and then passed on to the SCIU Control (52).

After the 'frame tic enable' signal is received from the Function Decoder, the SCIU Control then tests for the receipt of a Job Sync Tic from the Pha Decoder (46).

Upon receipt of a Job Sync Tic, the SCIU Control applies a 'counter enable' signal to the Conter (56) which causes it to start counting Timing Tics.

Upon receipt of a Timing Tic from the Phase Decoder (46), the Counter increments the number in its register by one, and when the register contains all "1"'s, Counter issues a Frame Tic which goes to both the SCIU Control (52) and to all Peripherals (22) at the Remote Site. The Counter is then immediately initialized for the next frame by refreshing it from the Frame Time Register (54).

Upon receipt of a Frame Tic the SCIU Control send a 'Look at Me' signal via the CAMAC Highway to the Central Computer.

The Central Computer then initiates a cycle of querying the peripherals attached to the Remote Site CAMAC Crate, transferring the data back to the central computer, making the necessary computations, and then returning the results to the Remote Site. This cycle must be completed within the Frame Time Interval.

In order for all functions of the Central Computer to be synchronized, the Frame Time Interval must be an integral factor of the CCM, so that each Job Sync Tic occurs simultaneously with the Frame Tic at all sites in the whole system.

The Frame Time Interval between Frame Tics is a sampling period which depends on the dynamics of the system being simulated, and the Frame Tic Count defines the number of Timing Tics required to define the Frame Time Interval. The entire Real Time Simulation model is re-computed once each Frame Time Interval using input data from a piloted Remote Site. For example, a commercial transport would require a relatively long Frame Time Interval (on the order of 25 milliseconds) whereas a helicopter, which normally includes flexible blade dynamics, would require a short Frame Time Interval (on the order of 5 milliseconds). Frame time intervals must be shorter than 64 milliseconds to provide the sense of continuity essential to "Real Time Simulation", in that the lag between control input and simulator feedback is imperceptible to the pilot/operator.

Figure 4:
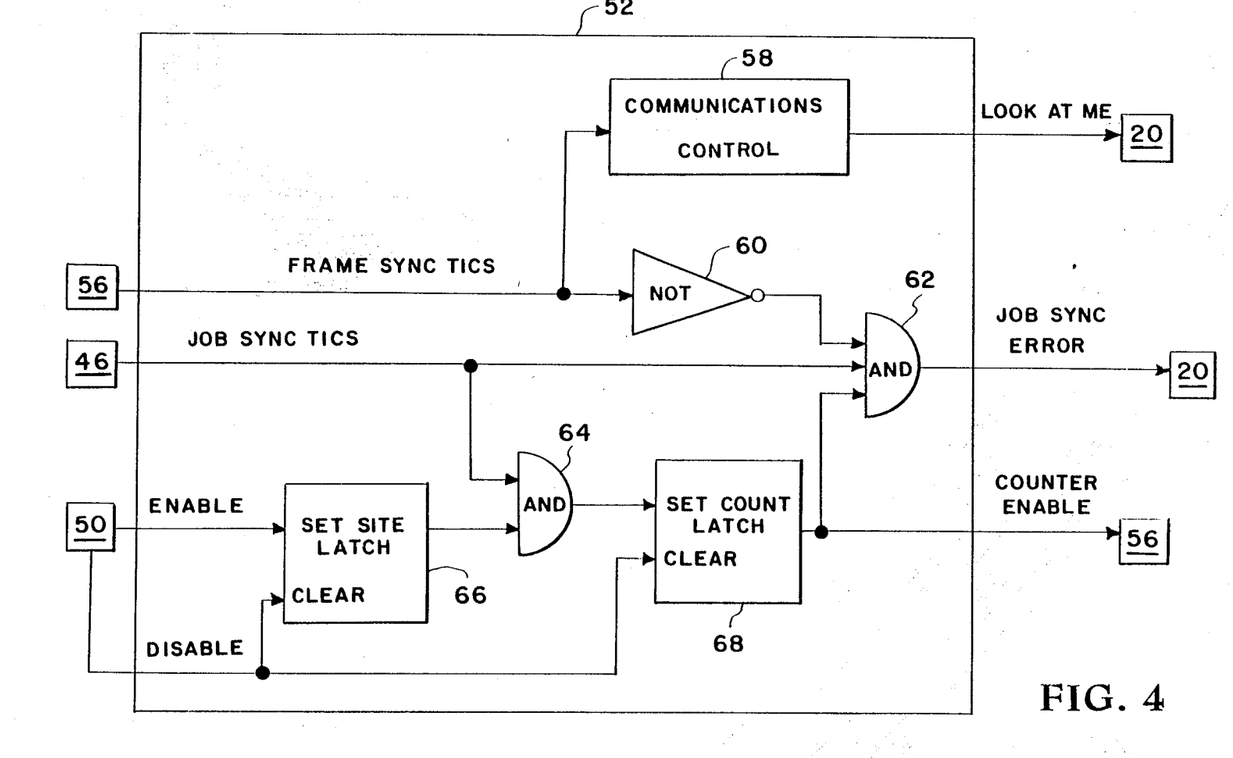
FIG. 4 A more detailed block diagram of the control block shown in FIG. 3.

The SCIU Control (52) is shown in more detail in FIG. 4. The 'site enable' signal from the Function Decoder (50) is applied to the Site Latch (66). When the Site Latch is enabled, it sends the 'site enable' signal on to an "AND" gate (64) which also receives the Job Sync Tics from the Phase Decoder (46). Consequently, when the Remote Site is enabled, and the first Job Sync Tic received, the Count Latch (68) is latched in by the signal from the "AND" gate (64) and the 'counter enable' signal is sent to the Conter (56). The Counter then counts Timing Tics until it issues a Frame Tic, as detailed above.

Frame Tics are passed back through the Control (52) to a "NOT" gate(60) and then on to the triple "AND" gate (62). Job Sync Tics are also applied to the triple "AND" gate, as is the 'counter enable' signal. Positive signalsd on all three lines entering the triple "AND" gate are required to open it, hence if during operation a Job Sync Tic is received and a Frame Tic is not received (an error, since every Job Sync Tic should be synchronized with Frame Tic), the triple "AND" gate (62) will cause the Job Sync Error bit to be set in the status word which will be detected by the central computer at the end of the frame time interval and the Real Time Simulation Job will be halted.

The Frame Tics arriving at the SCIU Control (52) are also applied the Communications Control (58) which then issues the 'Look at Me' signal for that Remote Site each time said Frame Tic is received.

When one Remote Site looses time synchronization, the entire job must be halted. When this occurs, the central computer sends a 'site disble' signal to each job site SCIU. Remote site SCIU's may also be selectively disabled during configuration by the same signal. Whenever the Remote Site SCIU is inactivated, the Function Decoder applies the 'site disable' signal to both the Site Latch (66) and the Count Latch (68), thereby stopping the Counter (56) from counting Timing Tics, and thereby stopping the generation of any further Frame Tics.

Although specific embodiments of the invention have been described herein, they are to be considered exemplary of the novel features thereof and are not exhaustive. There are obviously many variations and modifications of these specific examples that will be readily apparent to those skilled in the art in light of the above teachings without departing from the spirit or scope of the appended claims. It is, therefore, to be understood that the invention may be practiced otherwise than is specifically described.

What is claimed as new and desired to be secured by Letters Patent of the United States is:

1. A clock system for synchronizing opertations within a data processing network,
    said data processing network having network hardware, network software, and network communications means,
    said network hardware including a central computer and peripheral hardware,
    said network software including a monitor running on the central computer and a stored program adapted to run on the central computer,
    said stored program producing output for controlling the peripheral hardware,
    said data processing network including at least one remote site where the peripheral hadware is located, and
    said network communications means including data transfer means and control signal transmission means between the cetral computer and the remote site;
said clock system comprising:
    clock hardware, clock software and a clock network,
    said clock hardware comprising a central clock and at least one site clock interface unit, one such said site clock interface unit being located at each remote site,
    said central clock comprising means for accurately generating reference standard signals marking the passage of small equal intervals of time,
    said central clock additionally comprising means for counting the reference standard signals,
    said central clock additionally comprising means to generate timing tic, said timing tic being a first discrete signal which is generated at the end of each timing tic interval,
    said timing tic interval being the basis upon which the clock system builds longer intervals of time by the adding of multiple timing tic intervals,
    said timing tic interval being determined by the central clock counting the passage of a plurality of small intervals of time,
said central clock additionally comprising means to generate a job sync tic, said job sync tic being a second discrete signal which is generated after the central clock counts a clock common multiple of timing tics,
    said clock common multiple being a whole number of timing tic intervals necessary to mark the time between job sync tics,
    said job sync tic being the signal to the monitor to start a job on the central computer,
    said job sync tic additionally being the signal to the site clock interface unit to begin counting timing tics,
said site clock interface unit comprising means to generate a frame tic, said frame tic being a third discrete signal generated repetitively by the site clock interface unit after the passage of each frame time interval,
    said frame time interval being the time necessary for the central computer to complete a single input-process-output cycle for the stored program which is producing output for the peripheral hardware at the remote site,
    said frame time interval being dependent on the requirements of the peripheral hardware and the complexity of the stored program and therefore independent of the frame time interval at any other remote site,
    said frame time interval commencing simultaneously with the generation of a job sync tic,
    said frame time interval being evenly divisible into the clock common multiple so that the site clock interface unit generates a frame tic at the same time that the central clock generates a job sync tic,
said site clock interface unit additionally comprising means to generate a look-at-me signal,
    said look-at-me signal serving to signal the central computer that the peripheral hadware is ready to begin an input-process-output cycle,
    said look-at-me signal being generated upon receipt by the look-at-me signal generation means of a frame tic,
said clock software comprising a static scheduler running on the main computer,
said static scheduler comprising means to configure the date processing network such that the requirements of both the clock system and the stored program are met prior to running the stored program,
said static scheduler additionally comprising means to transmit a count enable signal to the site clock interface unit to prepare the site clock interface unit for the running of the stored program,
said static scheduler additionally comprising means for submitting the stored program to the monitor for running as a job on the central computer,
said static scheduler additionally comprising means to transmit a count disable signal to the site clock interface unit to inactivate the site clock interface unit upon termination of the the running of the stored program, said clock network comprising means of transmitting signals between the central clock and the site clock interface unit, said clock network additionally compring means of transmitting signals between the central clock and the central computer, and said clock network additionally comprising means of transmitting signals between the central computer and the site clock interface unit.

2. A clock system as in claim 1 wherein the site clock interface unit additionally comprises means for determining when to generate a frame tic, said means for determining when to generate a frame tic comprising:

a frame count register for storing a frame tic count, said frame tic count being a whole number of timing tics necessary to mark the time between frame tics, a first decision means to enable counting of timing tics upon receipt at the site clock interface unit of a count enable signal from the central computer, said first decision means additionally including means to terminate counting upon receipt of a count disable signal, a second decision means for initiating counting of timing tics upon receipt at the site clock interface unit of the first job sync tic after receipt at said site clock interface unit of a count enable signal, a counting means for counting the number of timing tics received, a third decision means for enabling the generation of a frame tic when the number of timing tics received equals the frame tic count, and a reset means for resuming counting of timing tics for a subsequent frame time interval.

3. A clock system as in claim 1 wherein the clock system additionally comprises hardware verification means to verify clock hardware operability hardware verification means comprising, status checking means within the clock system which change the value of a status indicator if clock hardware fails, status check software which enables the central computer to determine the value of the status indicator, and hardware failure software which terminates jobs on the central computer when the status check software signals a clock hardware failure.

4. A clock system as in claim 1 wherein the clock system additionally comprises sync verification means to verify synchronization of the clock system, said sync verification means comprising, loss-of-sync signal generating means in the site clock interface unit upon activation of which a loss-of-sync signal is transmitted to the central computer over the clock network, frame compare means to activate the loss-of-sync signal generating means if the site clock interface unit fails to generate a frame tic simultaneously with the arrival of job sync tic, and loss-of-sync terminating means for terminating all jobs on the central computer upon receipt at the central computer of a loss-of-sync signal from the site clock interface unit.

5. A clock system as in claim 1 wherein the means for transmitting signals between the central clock and the site clock interface unit comprises, a fiber optic cable between the central clock and the site clock interface unit, an electronic to fiber optic converter between the central clock and the fiber optic cable, and a fiber optic to electronic converter between the site clock interface unit and the fiber optic cable.

6. A clock system as in claim 1 wherein the means for transmitting signals between the cetral computer and the site clock interface unit comprises, a fiber optic cable between the central computer and each remote site, a network controller between the central computer and the fiber optic cable, a network interface between the fiber optic cable and the site clock interface unit, and network management software to control traffic over the network.

7. A clock system as in claim 1 wherein the configuration fuction of the static scheduler comprises:

means for determining whether the central computer has the capacity to run a new stored program, means for determining whether the remote site required by the new stored program is available for operation, means for determining whether the fram tic count necessary for the new stored program is divisible with no remainder into the clock common multiple, means for transmitting the frame tic count to the site clock interface unit, means for transmitting count enable signal to the site clock interface unit, and means for submitting the stored program to the monitor for running said stored program as a job on the central computer.

* * * * *